(12) United States Patent
Tian et al.

(10) Patent No.: US 10,710,701 B2
(45) Date of Patent: Jul. 14, 2020

(54) FOLDABLE MULTI-ROTOR UAV

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 395 days.

(21) Appl. No.: 15/844,640

(22) Filed: Dec. 18, 2017

(65) Prior Publication Data

US 2018/0105254 A1 Apr. 19, 2018

(30) Foreign Application Priority Data

| Dec. 19, 2016 | (CN) | 2016 2 1396715 U |
| Dec. 19, 2016 | (CN) | 2016 2 1396871 U |
| Dec. 19, 2016 | (CN) | 2016 2 1397207 U |
| Dec. 19, 2016 | (CN) | 2016 2 1397208 U |
| Dec. 19, 2016 | (CN) | 2016 2 1397209 U |

(51) Int. Cl.
*B64C 1/30* (2006.01)
*B64C 27/08* (2006.01)
*B64C 27/50* (2006.01)
*B64C 39/02* (2006.01)

(52) U.S. Cl.
CPC .............. *B64C 1/30* (2013.01); *B64C 27/08* (2013.01); *B64C 27/50* (2013.01); *B64C 39/024* (2013.01); *B64C 2201/024* (2013.01); *B64C 2201/027* (2013.01); *B64C 2201/108* (2013.01); *B64C 2201/20* (2013.01)

(58) Field of Classification Search
CPC ......... B64C 1/30; B64C 27/50; B64C 39/024; B64C 27/08; B64C 2201/024; B64C 2201/027; B64C 2201/108
USPC ....................................................... 244/17.23
See application file for complete search history.

(56) References Cited

U.S. PATENT DOCUMENTS

| 3,935,660 A | * | 2/1976 | Plew ....................... A01K 85/01 43/42.31 |
| 5,001,856 A | * | 3/1991 | Gentry ................... A01K 85/01 43/42.31 |
| 9,032,660 B2 | * | 5/2015 | Vanacore, Jr. ......... A01K 85/01 43/26.2 |

(Continued)

FOREIGN PATENT DOCUMENTS

| EP | 3210658 A1 * | 8/2017 | ........... B64C 39/024 |
| WO | WO-2016192021 A1 * | 12/2016 | ............. B64C 27/08 |
| WO | WO-2017205997 A1 * | 12/2017 | ........... B64C 39/024 |

*Primary Examiner* — Christopher P Ellis

(57) ABSTRACT

A foldable multi-rotor UAV includes: a fuselage; and a plurality of arms, wherein a first end of each of the arms is connected to a side face of the fuselage through a rotating mechanism; a motor and foldable blades connected to the motor are provided on a second end of each of the arms; each of the arms rotate relatively to the fuselage through the rotating mechanism; wherein the arms comprises a front arm and a rear arm; during a folded state, the rear arm upwardly rotates towards the fuselage for folding, in such a manner that the rear arm is contained at a lower portion of the side face of the fuselage; then the front arm upwardly rotates towards the fuselage for folding, in such a manner that the front arm is contained at an upper portion of the side face of the fuselage.

20 Claims, 13 Drawing Sheets

(56) References Cited

U.S. PATENT DOCUMENTS

| | | | |
|---|---|---|---|
| 10,035,597 B2* | 7/2018 | Desrochers | B64D 1/08 |
| 10,136,623 B2* | 11/2018 | Crain | A01K 85/01 |
| 10,426,149 B1* | 10/2019 | Coxey | A01K 85/14 |
| 2014/0059916 A1* | 3/2014 | Culver | A01K 85/00 |
| | | | 43/42.02 |
| 2014/0150329 A1* | 6/2014 | Waldroup | A01K 85/00 |
| | | | 43/42.25 |
| 2016/0167778 A1* | 6/2016 | Meringer | B64C 27/10 |
| | | | 244/17.23 |
| 2016/0176520 A1* | 6/2016 | Goldstein | B64C 39/024 |
| | | | 244/17.17 |
| 2018/0134369 A1* | 5/2018 | Tian | B64C 1/30 |
| 2018/0354620 A1* | 12/2018 | Baek | B64C 39/024 |
| 2019/0016435 A1* | 1/2019 | Nys Ter | B64C 1/30 |
| 2019/0031316 A1* | 1/2019 | Hefner | B64C 29/02 |
| 2019/0071178 A1* | 3/2019 | Caubel | A63H 27/007 |
| 2019/0185169 A1* | 6/2019 | Xu | H01M 2/263 |
| 2019/0216067 A1* | 7/2019 | Naig | A01K 85/01 |
| 2019/0291864 A1* | 9/2019 | Liu | B64C 37/00 |
| 2019/0344877 A1* | 11/2019 | Gilliland | B64C 29/0033 |
| 2020/0031460 A1* | 1/2020 | Millhouse | B64C 27/50 |
| 2020/0055594 A1* | 2/2020 | Tal | B64C 27/50 |
| 2020/0062373 A1* | 2/2020 | Liao | B64C 39/024 |
| 2020/0070969 A1* | 3/2020 | Campbell | B64C 3/56 |
| 2020/0071010 A1* | 3/2020 | Konig | B65B 31/04 |

* cited by examiner

FOLDABLE MULTI-ROTOR UAV

CROSS REFERENCE OF RELATED APPLICATION

The present invention claims priority under 35 U.S.C. 119(a-d) to CN 201621396715.4, filed Dec. 19, 2016; CN 201621396871.0, filed Dec. 19, 2016; CN 201621397207.8, filed Dec. 19, 2016; CN 201621397208.2, filed Dec. 19, 2016; and CN 201621397209.7, filed Dec. 19, 2016.

BACKGROUND OF THE PRESENT INVENTION

Field of Invention

The present invention relates to a technical field of UAV, and more particularly to a foldable multi-rotor UAV.

Description of Related Arts

In recent years, UAVs have been receiving more and more attention due to their simple structure, convenient handling and high safety performance. However, the conventional multi-rotor UAVs have problems such as larger size, encasing, transporting or carrying inconveniences. Conventionally, the UAV arm and the fuselage are mainly integrally formed. For the rest of the UAVs, the arm is divided into a first arm and a second arm. The first arm and the body are integrally formed, and the second arm is detachably connected to the first arm. Alternatively, the whole arm is detachably connected to the whole body, which to some extent solves the problems of transportation and storage space. However, manual installation is complicated. As a result, some arms are designed to be foldable without the need for manual installation, but their foldable form reduces the space available for the fuselage, resulting in less space utilization, larger fuselage sizes with blades exposed, and inconvenient carrying or transporting. Furthermore, the blades are easy to touch other objects, causing damage to the blade itself. In addition, exposed blade is also very easy to scratch pockets, bags or people.

Therefore, there is a lack of a UAV that has high space utilization rate after the arms are folded, has overall compactness and cleanness, and reduces the degree of blade exposure.

In addition, there is also a lack of a UAV whose arms fold without order requirement to provide a better operation experience and to avoid interference with the holder structure, thereby providing more possibilities for the design of the holder, as well as possibilities for the design of blade and motor.

SUMMARY OF THE PRESENT INVENTION

An object of the present invention is to provide a foldable multi-rotor UAV with advantages such as high space utilization rate after arms are folded, overall compactness, clean appearance, being easy to carry, and preventing blades from touching other objects, wherein on one hand the blades are protected, on the other hand the blades are prevented from scratching pockets, bags or people.

Accordingly, the present invention provides a foldable multi-rotor UAV (unmanned aerial vehicle), comprising: a fuselage; and a plurality of arms, wherein a first end of each of the arms is connected to a side face of the fuselage through a rotating mechanism; a motor and foldable blades connected to the motor are provided on a second end of each of the arms; each of the arms rotate relatively to the fuselage through the rotating mechanism; wherein the arms comprises a front arm and a rear arm; during a folded state, the rear arm upwardly rotates towards the fuselage for folding, in such a manner that the rear arm is contained at a lower portion of the side face of the fuselage, and the foldable blades on the rear arm are placed between the rear arm and the fuselage; then the front arm upwardly rotates towards the fuselage for folding, in such a manner that the front arm is contained at an upper portion of the side face of the fuselage, and the foldable blades on the front arm are placed between the front arm and the fuselage.

Preferably, the rotating mechanism comprises a fuselage end, an arm end, and a shaft; wherein the fuselage end is connected to the arm end through the shaft; the fuselage end is connected to the fuselage, and the arm end is connected to one of the arms; the arms rotate relative to the fuselage when the shaft rotates.

Preferably, both the fuselage end and the arm end have a shaft hole for inserting the shaft; a first portion of the shaft is placed in the shaft hole of the fuselage end, and a second portion of the shaft is placed in the shaft hole of the arm end.

Preferably, the fuselage end of the rotating mechanism connected to the arm end is placed above the arm end.

Preferably, the rotating mechanism is S-shaped with certain curvatures.

Preferably, the shaft is fixedly connected to the fuselage end and is movably connected to the arm end, in such a manner that each of the arms rotates relative to the fuselage around the shaft; or the shaft is fixedly connected to the arm end and is movably connected to the fuselage end, in such a manner that each of the arms and the shaft rotate relative to the fuselage; or the shaft is movably connected to both the arm end and the fuselage end, in such a manner the shaft, the arm end and the fuselage end rotate relative to each other.

Preferably, the rotating mechanism comprises a limit locking device which is a buckle, a matching groove or an impeller.

Preferably, end faces of both the fuselage end and the arm end are round end faces and match with each other.

Preferably, all the arms have a certain curvature, and cross sections of each of the arms are different along a length direction; cross section areas vary from one end to the other end of each of the arms. As a result, after being folded, the arms are staggered at both sides of the fuselage, so as to take full advantage of interior space of conventional straight arms with equal cross sections when being folded.

Preferably, the rotating mechanism connected to the front arm is placed at a front top of the side face of the fuselage; the rotating mechanism connected to the rear arm is placed at a rear bottom of the side face of the fuselage.

Preferably, a holder is provided at a bottom of the fuselage.

Preferably, the shaft is perpendicular to the end face of the fuselage end and/or the end face of the arm end.

Preferably, the end faces of both the fuselage end and the arm end are the round end faces.

Preferably, the end faces of both the fuselage end and the arm end match with each other.

Preferably, the shaft coincides with a central axis of the fuselage end.

Preferably, the shaft coincides with a central axis of the arm end.

Preferably, a locking structure and a cooperating locking structure are buckle parts.

Preferably, under an unfolded state or a flying state, the foldable blades are above the arms.

The present invention also provides a foldable multi-rotor UAV, comprising:
   a fuselage; and
   a plurality of arms, wherein a first end of each of the arms is connected to a side face of the fuselage through a rotating mechanism; a motor and foldable blades connected to the motor are provided on a second end of each of the arms; each of the arms rotate relatively to the fuselage through the rotating mechanism;
   wherein the arms comprises a front arm and a rear arm; during a folded state, the front arm upwardly rotates towards the fuselage for folding, in such a manner that the front arm is contained at an upper portion of the side face of the fuselage, and the foldable blades on the front arm are placed between the front arm and the fuselage; then the rear arm downwardly rotates towards the fuselage for folding, in such a manner that the rear arm is contained at a lower portion of the side face of the fuselage, and the foldable blades on the rear arm are placed exterior to the rear arm and away from the fuselage.

The present invention also provides a foldable multi-rotor UAV, comprising:
   a fuselage; and
   a plurality of arms, wherein a first end of each of the arms is connected to a side face of the fuselage through a rotating mechanism; a motor and foldable blades connected to the motor are provided on a second end of each of the arms; each of the arms rotate relatively to the fuselage through the rotating mechanism;
   wherein the arms comprises a front arm and a rear arm; during a folded state, the front arm upwardly rotates towards the fuselage for folding, in such a manner that the front arm is contained at an upper portion of the side face of the fuselage, and the foldable blades on the front arm are placed exterior to the rear arm and away from the fuselage; then the rear arm downwardly rotates towards the fuselage for folding, in such a manner that the rear arm is contained at a lower portion of the side face of the fuselage, and the foldable blades on the rear arm are placed exterior to the rear arm and away from the fuselage.

Main advantages of the present invention are as follows:
   (a) high space utilization rate after folding;
   (b) compacted structure and clean appearance, which is easy to carry;
   (c) protecting blades;
   (d) preventing blades from scratching pockets, bags or people; and
   (e) small rotation angle of arms during folding and unfolding.

Therefore, according to the present invention, the foldable blades and the motor are placed between the fuselage and the arms after folding, leading to advantages such as high space utilization rate after arms are folded, overall compactness, clean appearance, being easy to carry, and preventing blades from touching other objects, which on one hand the blades are protected, on the other hand the blades are prevented from scratching pockets, bags or people.

It should be understood that, within the scope of the present invention, each technical feature of the present invention described above and various technical features described as follows (as embodiment) may be combined with each other to form a new or preferred technical solution. Due to space limitations, no longer tired here.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

ELEMENT REFERENCE

Figure 1:
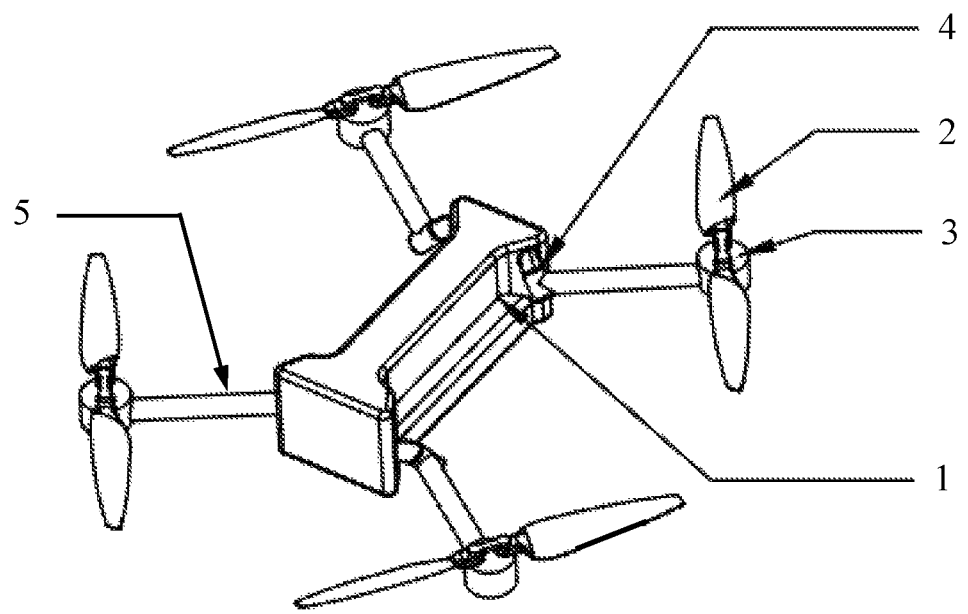
FIG. 1 is a state diagram of a multi-rotor UAV with arms unfolded in a first embodiment of the present invention.

1—fuselage;
2—foldable blade;
3—motor;
4—rotating mechanism;
5—arm;
6—landing gear;
7—folding mechanism;
8—groove.

DETAILED DESCRIPTION OF THE PREFERRED EMBODIMENT

After extensive and in-depth research, the inventor developed a foldable multi-rotor UAV for the first time through a large number of screening. Compared with the prior art, a front arm and a rear arm of the UAV of the present invention rotate upwardly and fold towards a fuselage; the rear arm is folded first and contained at a lower portion of a side face of the fuselage, then the front arm is folded and contained at an upper portion of the side face of the fuselage; foldable blades on arms are folded and placed between the arms and the fuselage. Therefore, after folding, top, bottom and side portions of the fuselage are available for installing other parts, providing advantages such as high space utilization rate, overall compactness after the arms are folded, clean appearance, being easy to carry in pockets or bags, and preventing blades and motors from touching other objects, wherein on one hand completeness of the UAV are protected, on the other hand the blades are prevented from scratching pockets, bags or people. The present invention is based on the above features.

The present invention is further described as follows with reference to preferred embodiments. One skilled in the art will understand that the embodiment of the present invention as shown in the drawings and described is exemplary only and not intended to be limiting. In addition, the drawings are schematic diagrams, and thus device and apparatus of the present invention are not limited by the size or the ratio of the schematic diagram.

It should be noted that, in the claims and specification of the present invention, terms such as "up", "down", "upward", "downward", "front left", "front right", "rear left", "rear right", "top", "bottom", "upper", "lower" and the like are relative to the UAV flight state direction and are merely used to describe the relative ease of each component but not necessarily indicating the existence of such physical positional relationship among the various components; relational terms such as first and second, and the like are merely used to distinguish one entity or operation from another entity or operation, not necessarily require or imply that any such actual relationship or sequence exists between these entities or operations. Moreover, the terms "comprise" "comprising" or any other variations thereof are intended to cover a non-exclusive inclusion such that a process, method, article, or device that comprises not only those elements listed, but also other elements that are inherent to such process, method, article, or device. Without further limitations, an element described with "one" or the like is not intended to exclude additional elements that are common to the process, method, article, or device that includes the element.

Referring to FIGS. 1-5 of the drawings, according to the present invention, a foldable multi-rotor UAV comprises a fuselage 1, foldable blades 2, a motor 3, a rotating mechanism 4 and arms 5. There are four arms 5 which are formed by two front arms and two rear arms, wherein a first end of the arm 5 is connected to the fuselage 1 through the rotating mechanism 4, and a second end of the arm 5 is connected to the motor 3 which is connected to the foldable blades 3. The two front arms are respectively placed at front upper portions of side faces of the fuselage 1 through the rotor mechanism 4 connected to the front arms, and the two rear arms are respectively placed at rear lower portions of the side faces of the fuselage 1 through the rotor mechanism 4 connected to the rear arms. Besides, the rotating mechanism comprises a fuselage end, an arm end, and a shaft; wherein the fuselage end is connected to the arm end through the shaft. The fuselage end is a portion of the fuselage 1 which is near the arm 5, and the arm end is a portion of the arm 5 which is near the fuselage 1. The arms 5 rotate relative to the fuselage 1 when the shaft rotates, and the fuselage end of the rotating mechanism is above the arm end. The rotating mechanism 4 is S-shaped with certain curvatures.

Specifically, unfolded arms 5 of the foldable UAB are shown in FIG. 1. When being unfolded, the front arms are respectively extended to a front left and a front right, and the foldable blades 2 are placed above the front arms as well as unfolded. When being unfolded, the rear arms are respectively extended to a rear left and a rear right, and the foldable blades 2 are also placed above the front arms as well as unfolded.

Folded arms 5 of the foldable UAB are shown in FIGS. 2-5. During a folded state, the rear arm upwardly rotates towards the fuselage 1 for folding, in such a manner that the rear arm is contained at a lower portion of the side face of the fuselage 1, and the foldable blades 2 on the rear arm are placed between the rear arm and the fuselage 1; then the front arm upwardly rotates towards the fuselage 1 for folding, in such a manner that the front arm is contained at an upper portion of the side face of the fuselage 1, and the foldable blades 2 on the front arm are placed between the front arm and the fuselage 1. As a result, the front and rear arms are staggered, and the foldable blades 2 are placed between the arms 5 and the fuselage, thereby providing overall compactness after the arms 5 are folded, clean appearance, and high space utilization rate as top, bottom and side portions of the fuselage are available for installing other parts. In addition, the folded UAV is easy to carry in pockets or bags, preventing blades and motors from touching other objects, wherein on one hand completeness of the UAV are protected, on the other hand the blades are prevented from scratching pockets, bags or people.

End faces of both the fuselage end and the arm end are round end faces and match with each other during flight. In addition, the shaft is perpendicular to the two round end faces, and the shaft coincides with a central axis of the fuselage end as well as a central axis of the arm end. Both the fuselage end and the arm end have a shaft hole for inserting the shaft; a half of the shaft is placed in the shaft hole of the fuselage end, and another half of the shaft is placed in the shaft hole of the arm end. The shaft is fixedly connected to the fuselage end and is movably connected to the arm end, in such a manner that each of the arms rotates relative to the fuselage around the shaft. A convex is provided at a joint of the shaft and the arm 5, and a locking convex part is provided on the arm 5 for matching the convex, so as to lock the convex when the arms 5 rotate to an unfolded state.

Figure 6:
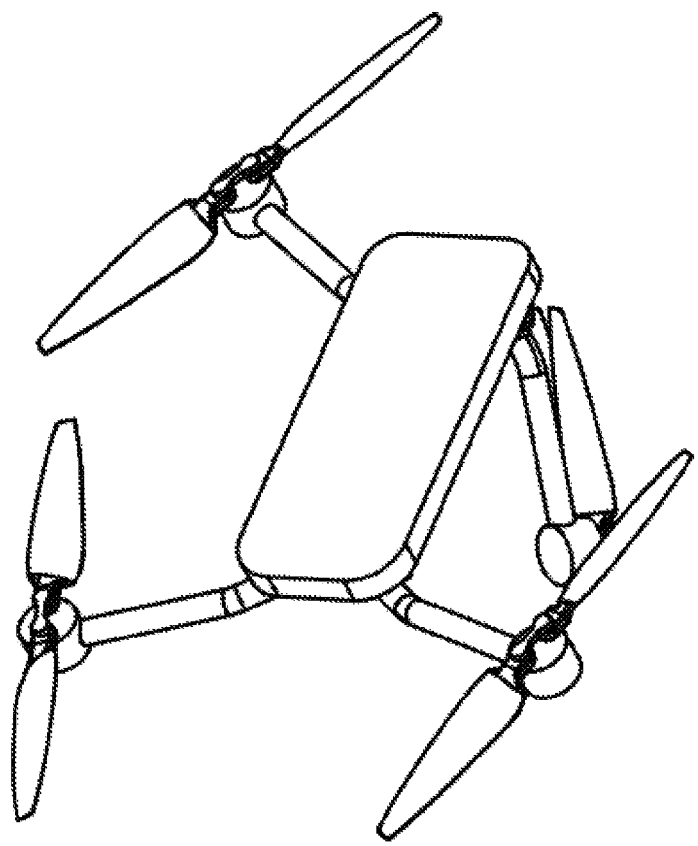
FIG. 6 is a state diagram of a folding process of a front arm of a multi-rotor UAV in a second embodiment of the present invention.
Figure 7:
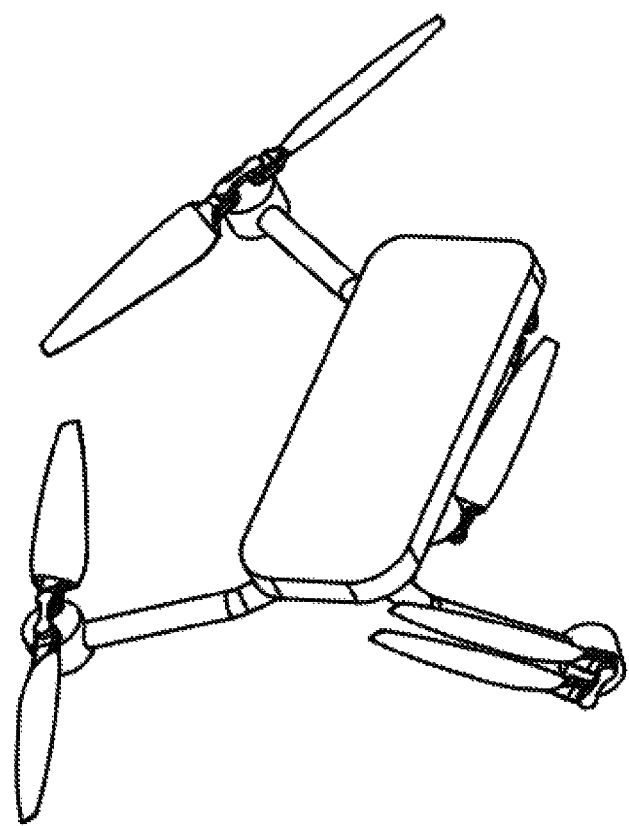
FIG. 7 is a state diagram of a rear arm folding process after the front arm of the multi-rotor UAV is folded according to the second embodiment of the present invention.
Figure 8:
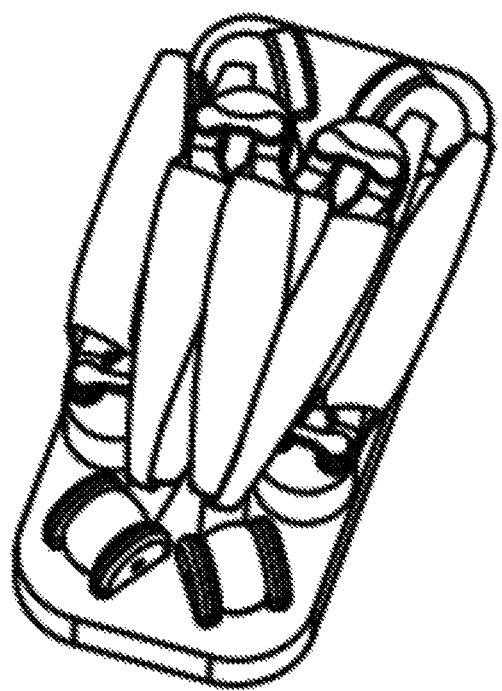
FIG. 8 is a state diagram of containing folded arms of the multi-rotor UAV at a bottom portion of a fuselage in the second embodiment of the present invention.
Figure 9:
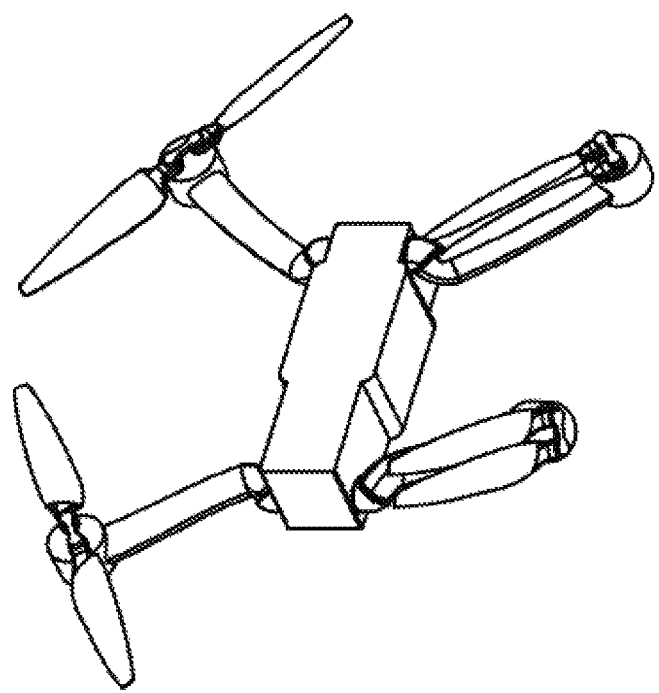
FIG. 9 illustrates that a rear arm of a multi-rotor UAV is folded downwardly in a third embodiment of the present invention.
Figure 10:
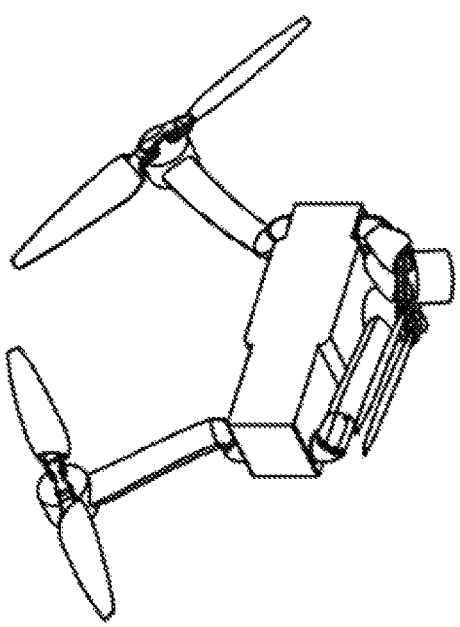
FIG. 10 illustrates that a front arm is folded upwardly when the rear arm of the multi-rotor UAV is folded according to the third embodiment of the present invention.
Figure 11:
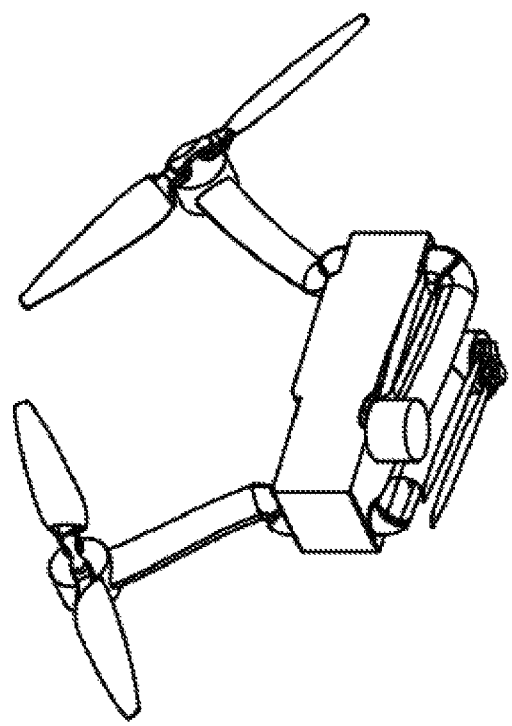
FIG. 11 illustrates that a set of arms of the multi-rotor UAV are folded in the third embodiment of the present invention.
Figure 12:
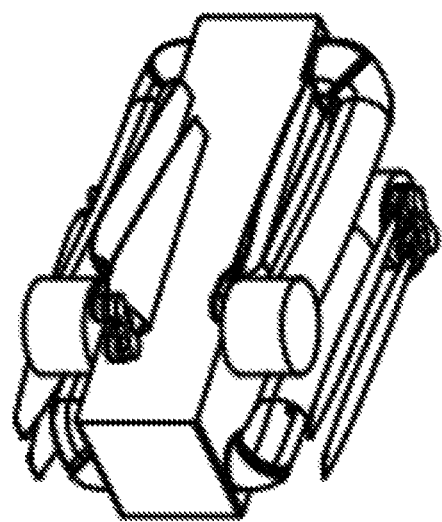
FIG. 12 illustrates that all the arms of the multi-rotor UAV are folded in the third embodiment of the present invention.
Figure 13:
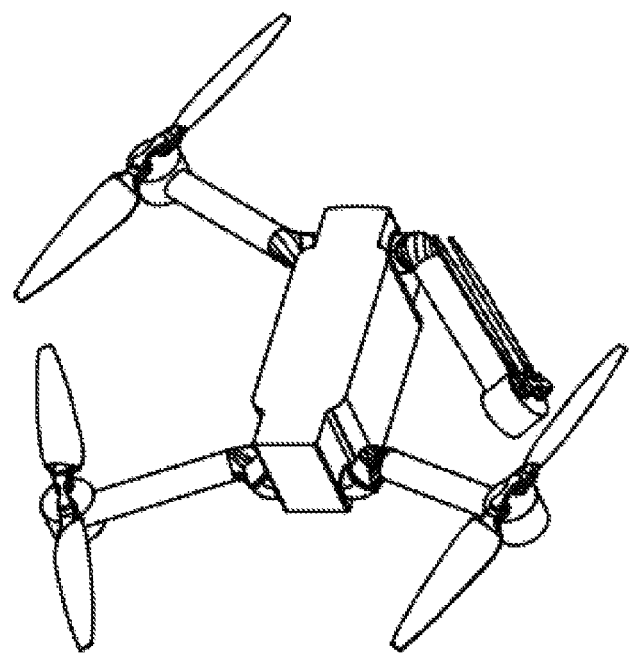
FIG. 13 is a state diagram of a multi-rotor UAV with a front arm folded in a fourth embodiment of the present invention.
Figure 14:
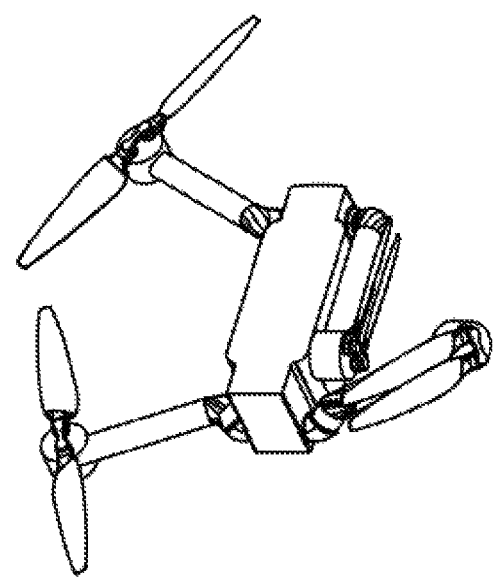
FIG. 14 is a state diagram of the multi-rotor UAV with a rear arm folded in the fourth embodiment of the present invention.
Figure 15:
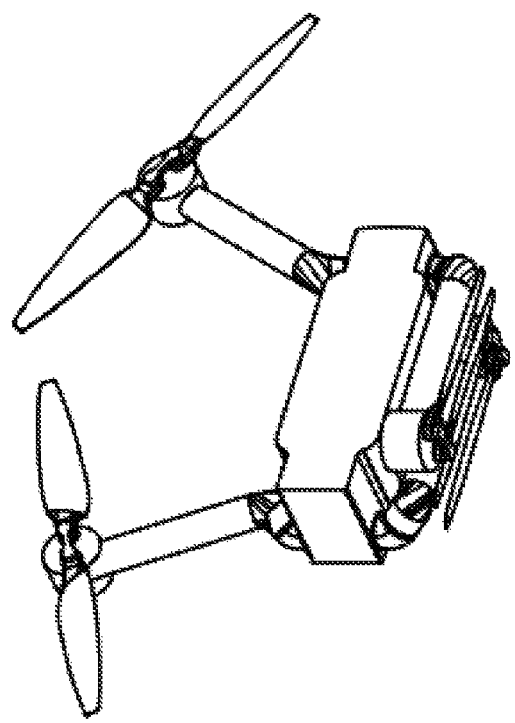
FIG. 15 is a state diagram of a set of completely folded front and rear arms of the multi-rotor UAV according to the fourth embodiment of the present invention.
Figure 16:
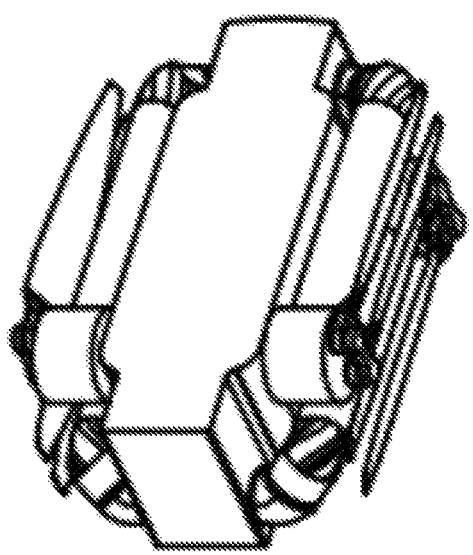
FIG. 16 is a state diagram of completely folded arms of the multi-rotor UAV according to the fourth embodiment of the present invention.

According to a second embodiment, as shown in FIGS. 6-8, the four arms 5 are evenly distributed around the fuselage 1, and connected to the fuselage 1 through four rotating mechanisms 4; wherein the four rotating mechanisms 4 are respectively mounted at four corners at a bottom of the fuselage 1, enabling the arms 5 to rotate around the rotating mechanism 4 within a plane. Each of the arms 5 comprises the motor 3 and the foldable blades 2, wherein the motor 3 is fixedly connected to the arm 5, and the foldable blades 2 are fixedly connected to the motor 3.

The arms 5 are formed by the front arms and the rear arms. There are two front arms which are connected to a front of the fuselage 1 through the rotating mechanism 4, and the rotating mechanism 4 is placed at a front of a bottom of the fuselage 1. When being unfolded, the front arms are respectively extended to the front left and the front right of the UAV, and the foldable blades 2 are also unfolded. When being folded, the foldable blades 2 are folded, and the front arms rotate around the rotating mechanism 4 within a plane and towards the bottom of the fuselage 1, wherein the foldable blades 2 are exposed and away from the bottom of the fuselage 1. There are two rear arms which are connected to a rear of the fuselage 1 through the rotating mechanism 4, and the rotating mechanism 4 is placed at a rear of the bottom of the fuselage 1. When being unfolded, the rear arms are respectively extended to the rear left and the rear right of the UAV, and the foldable blades 2 are also unfolded. When being folded, the foldable blades 2 are folded, and the rear arms rotate around the rotating mechanism 4 within a plane and towards the bottom of the fuselage 1, wherein the foldable blades 2 exposed and away from the bottom of the fuselage 1.

During folding the arm 5, there is no order requirement, wherein the front arms may be folded first, then the rear arms are folded; or the rear arms may be folded first, then the front arms are folded; or one of the front arms may be folded first, then one of the rear arms is folded, then the other front arm is folded, and finally the other rear arm is folded. There may be different folding methods for lowering folding difficulty, which is conducive to protecting parts of the arms 5 and wide application.

In addition, a distance between the rotating mechanisms 4 connected to the front arms is shorter than a distance between the rotating mechanisms 4 connected to the rear arms, in such a manner that the front arms are interior to the rear arms without intersection.

Alternatively, the distance between the rotating mechanisms 4 connected to the front arms is longer than the distance between the rotating mechanisms 4 connected to the rear arms, in such a manner that the front arms are exterior to the rear arms without intersection.

The rotating mechanism comprises a fuselage end, an arm end, and a shaft; wherein the fuselage end is connected to the arm end through the shaft. The fuselage end is a portion of the fuselage 1 which is near the arm 5, and the arm end is a portion of the arm 5 which is near the fuselage 1. End faces of both the fuselage end and the arm end are round end faces and match with each other during flight. In addition, the shaft is perpendicular to the two round end faces, and the shaft coincides with a central axis of the fuselage end as well as a central axis of the arm end. Both the fuselage end and the arm end have a shaft hole for inserting the shaft; a half of the shaft is placed in the shaft hole of the fuselage end, and another half of the shaft is placed in the shaft hole of the arm end. The shaft is fixedly connected to the fuselage end and is movably connected to the arm end, in such a manner that each of the arms rotates relative to the fuselage around the shaft. A convex is provided at a joint of the shaft and the arm 5, and a locking convex part is provided on the arm 5 for matching the convex, so as to lock the convex when the arms 5 rotate to an unfolded state.

According to a third embodiment, as shown in FIGS. 9-12, a first end of the arm 5 is connected to the fuselage 1 through the rotating mechanism 4, and a second end of the arm 5 is connected to the motor 3 which is connected to the foldable blades 3. The two front arms are respectively placed at front upper portions of side faces of the fuselage 1 through the rotor mechanism 4 connected to the front arms, and the two rear arms are respectively placed at rear lower portions of the side faces of the fuselage 1 through the rotor mechanism 4 connected to the rear arms. Besides, the arm 5 has a certain curvature, and cross sections of the arm 5 are different, in such a manner that after being folded, the arms 5 are staggered at both sides of the fuselage 1, so as to take full advantage of interior space of conventional straight arms with equal cross sections when being folded.

The rotating mechanism comprises a fuselage end, an arm end, and a shaft; wherein the fuselage end is connected to the arm end through the shaft. The fuselage end is a portion of the fuselage 1 which is near the arm 5, and the arm end is a portion of the arm 5 which is near the fuselage 1. The arms 5 rotate relative to the fuselage 1 when the shaft rotates. The fuselage end of the rotating mechanism connected to the front arms is placed above the arm end, and the arm end of the rotating mechanism connected to the rear arms is placed above the fuselage end. The rotating mechanism 4 is S-shaped with certain curvatures.

When the arms 5 of the foldable UAB are folded, the front arms of the foldable UAV are respectively extended to a front left and a front right, and the foldable blades 2 are placed above the rear arms as well as unfolded. When being unfolded, the rear arms are respectively extended to a rear left and a rear right, and the foldable blades 2 are also placed above the rear arms as well as unfolded.

When the arms 5 of the foldable UAB are folded, the front arm upwardly rotates towards the fuselage 1 for folding, in such a manner that the front arm is contained at an upper portion of the side face of the fuselage 1, and the foldable blades 2 on the front arm are placed between the front arm and the fuselage 1; then the rear arm downwardly rotates towards the fuselage 1 for folding, in such a manner that the rear arm is contained at a lower portion of the side face of the fuselage 1, and the foldable blades 2 on the rear arm are placed exterior to the rear arm and away from the fuselage 1. The front and rear arms are staggered, wherein the foldable blades 2 and the motor 3 on the front arm face inward, and those on the rear arm face outward. As a result, a rotation angle is small while the motor 3 and the foldable blades 2 are exposed outside the fuselage 1, which enables more designs of the motor 3 and the foldable blades 2. Therefore, there is no order requirement during folding or unfolding the arms 5, so as to provide a better operating experience. The arms 5 are designed to have the certain curvature, in such a manner that the arms 5 are staggered with shorter intervals, enabling design of a smaller UAV.

End faces of both the fuselage end and the arm end are round end faces and match with each other during flight. In addition, the shaft is perpendicular to the two round end faces, and the shaft coincides with a central axis of the fuselage end as well as a central axis of the arm end. Both the fuselage end and the arm end have a shaft hole for inserting the shaft; a half of the shaft is placed in the shaft hole of the fuselage end, and another half of the shaft is placed in the shaft hole of the arm end. The shaft is fixedly connected to the fuselage end and is movably connected to the arm end, in such a manner that each of the arms rotates relative to the fuselage around the shaft. A convex is provided at a joint of the shaft and the arm 5, and a locking convex part is provided on the arm 5 for matching the convex, so as to lock the convex when the arms 5 rotate to an unfolded state.

According to a fourth embodiment, as shown in FIGS. 13-16, a first end of the arm 5 is connected to the fuselage 1 through the rotating mechanism 4, and a second end of the arm 5 is connected to the motor 3 which is connected to the foldable blades 3. The two front arms are respectively placed at front upper portions of side faces of the fuselage 1 through the rotor mechanism 4 connected to the front arms, and the two rear arms are respectively placed at rear lower portions of the side faces of the fuselage 1 through the rotor mechanism 4 connected to the rear arms. Besides, the rotating mechanism comprises a fuselage end, an arm end, and a shaft; wherein the fuselage end is connected to the arm end through the shaft. The fuselage end is a portion of the fuselage 1 which is near the arm 5, and the arm end is a portion of the arm 5 which is near the fuselage 1. The arms 5 rotate relative to the fuselage 1 when the shaft rotates, and the fuselage end of the rotating mechanism is above the arm end. The rotating mechanism 4 is S-shaped with certain curvatures.

When the arms 5 of the foldable UAB are unfolded, the front arms of the foldable UAV are respectively extended to a front left and a front right, and the foldable blades 2 are placed above the rear arms as well as unfolded. When being unfolded, the rear arms are respectively extended to a rear left and a rear right, and the foldable blades 2 are also placed above the rear arms as well as unfolded.

When the arms 5 of the foldable UAB are folded, the front arm upwardly rotates towards the fuselage 1 for folding, in such a manner that the front arm is contained at an upper portion of the side face of the fuselage 1, and the foldable blades 2 on the front arm are placed exterior to the front arm and away from the fuselage 1; then the rear arm downwardly rotates towards the fuselage 1 for folding, in such a manner that the rear arm is contained at a lower portion of the side face of the fuselage 1, and the foldable blades 2 on the rear arm are placed exterior to the rear arm and away from the fuselage 1. The front and rear arms are staggered after being folded, wherein a rotation angle is small while the motor 3 and the foldable blades 2 are exposed outside the fuselage 1, which enables more designs of the motor 3 and the foldable blades 2.

End faces of both the fuselage end and the arm end are round end faces and match with each other during flight. In addition, the shaft is perpendicular to the two round end faces, and the shaft coincides with a central axis of the fuselage end as well as a central axis of the arm end. Both the fuselage end and the arm end have a shaft hole for inserting the shaft; a half of the shaft is placed in the shaft hole of the fuselage end, and another half of the shaft is placed in the shaft hole of the arm end. The shaft is fixedly connected to the fuselage end and is movably connected to the arm end, in such a manner that each of the arms rotates relative to the fuselage around the shaft. A convex is provided at a joint of the shaft and the arm 5, and a locking convex part is provided on the arm 5 for matching the convex, so as to lock the convex when the arms 5 rotate to an unfolded state.

Figure 17:
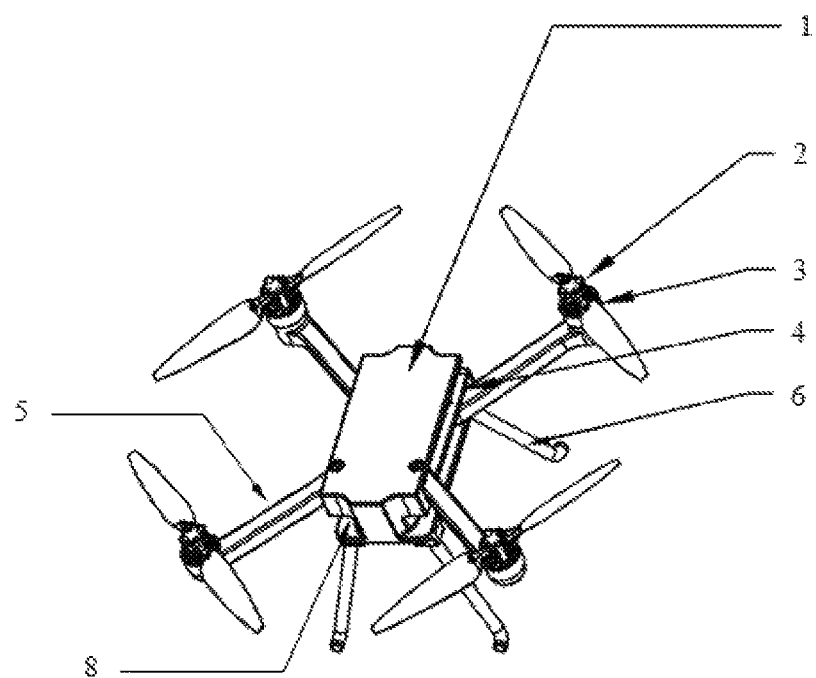
FIG. 17 is a perspective view of a multi-rotor UAV with a landing gear in a fifth embodiment of the present invention.
Figure 18:
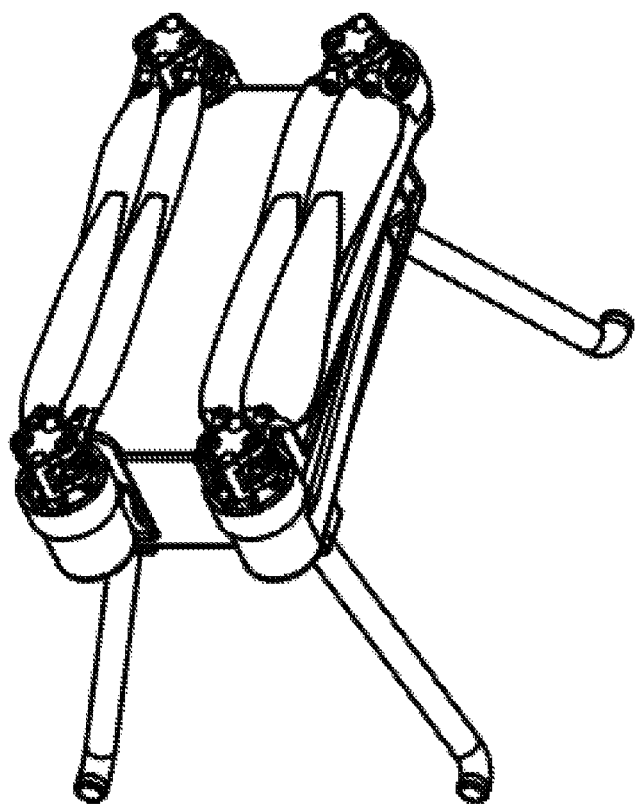
FIG. 18 is a state diagram of the multi-rotor UAV with folded arms according to the fifth embodiment of the present invention.
Figure 19:
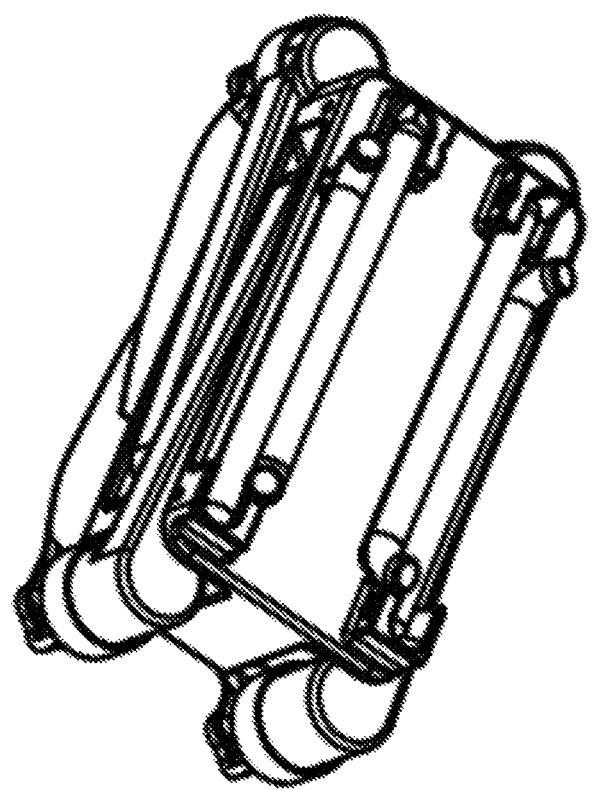
FIG. 19 is a state diagram of the multi-rotor UAV with folded arms and folded landing gear in the fifth embodiment of the present invention.

According to a fifth embodiment, as shown in FIGS. 17-19, a foldable multi-rotor UAV with a landing gear comprises a fuselage 1, foldable blades 2, a motor 3, a rotating mechanism 4, arms 5, the landing gear 6 and a folding mechanism 7, wherein the arms 5 and the landing gear 6 are foldable. There are four arms 5 which are evenly distributed around the fuselage 1; and connected to the fuselage 1 through rotating mechanisms 4. Each of the arms 5 comprises the motor 3 and the foldable blades 2, wherein the motor 3 is fixedly connected to the arm 5, and the foldable blades 2 are fixedly connected to the motor 3. There are four landing gears 6, and first ends of the four landing gears 6 are respectively connected to a bottom of the fuselage 1 through four folding mechanisms 7. The folding mechanisms 7 are respectively mounted at four corners at the bottom of the fuselage 1 of the foldable multi-rotor UAV with the landing gear. Four grooves 8 are provided on the fuselage 1 for containing the arms 5.

Figure 2:
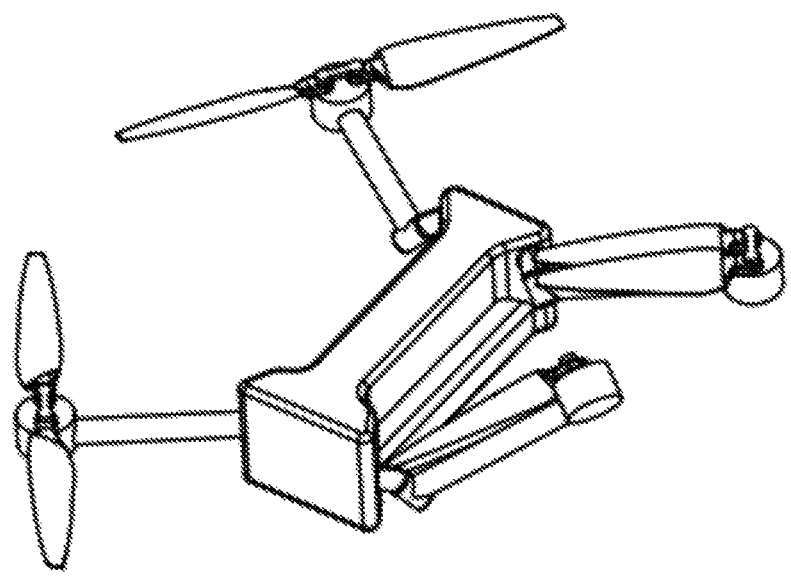
FIG. 2 is a state diagram of the multi-rotor UAV with a rear arm folded in the first embodiment of the present invention.
Figure 3:
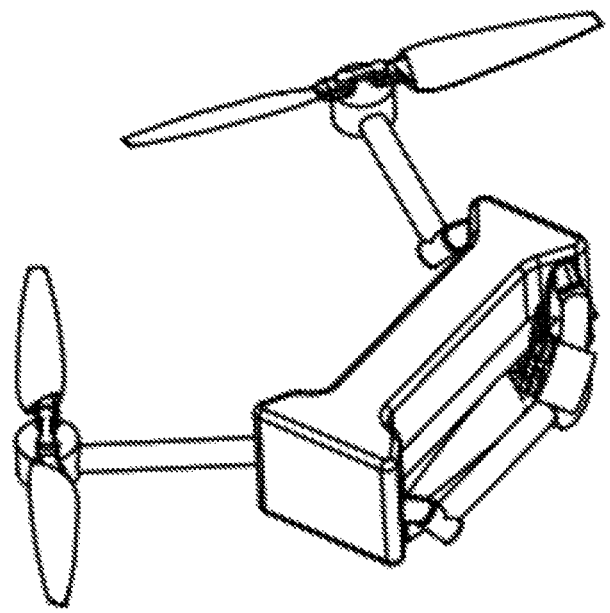
FIG. 3 is a state diagram of folding a front arm when the rear arm of the multi-rotor UAV is folded in the first embodiment of the present invention.
Figure 4:
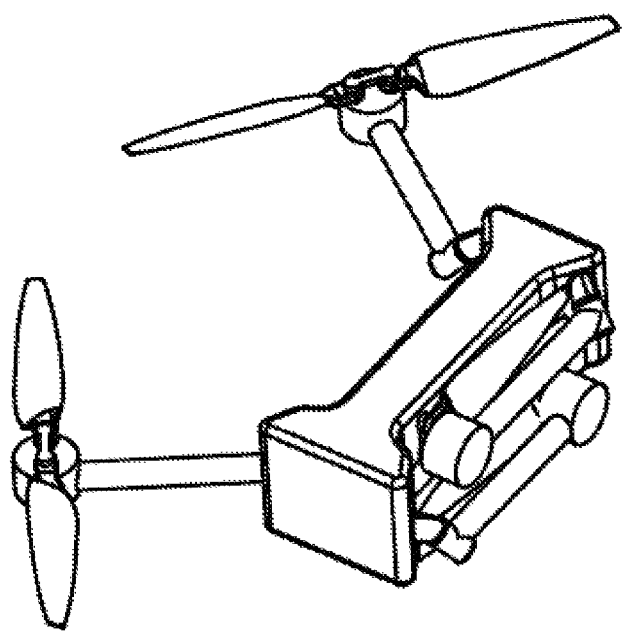
FIG. 4 is a state diagram of a set of completely folded front and rear arms of the multi-rotor UAV according to the first embodiment of the present invention.
Figure 5:
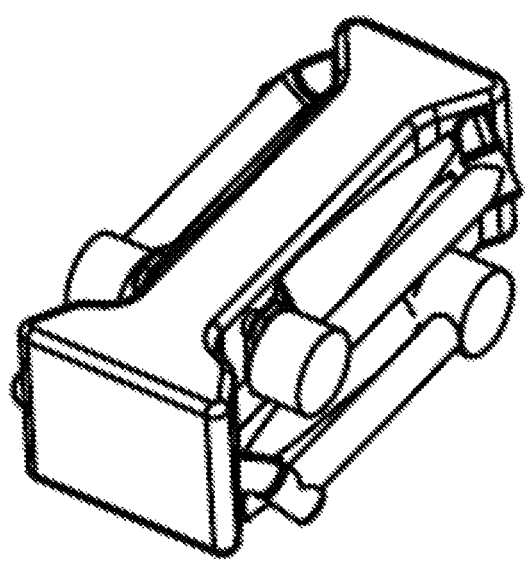
FIG. 5 is a state diagram of completely folded arms of the multi-rotor UAV according to the first embodiment of the present invention.

When the arms 5 of the foldable UAV is unfolded, two sets of upper and lower grooves 8 are respectively arranged at both sides of the fuselage 1. The arms 5 are formed by the front arms and the rear arms. There are two front arms which are connected to a front of the fuselage 1 through the rotating mechanism 4, and the rotating mechanism 4 is placed at a front of the lower groove 8 at the side of the fuselage 1. When being unfolded, the front arms are respectively extended to the front left and the front right of the UAV, and the foldable blades 2 are also unfolded. When being folded, the foldable blades 2 are folded, and the front arms rotate around the rotating mechanism 4 within a plane and towards the groove 8 of the fuselage 1 until the front arm is contained in the lower groove 8 at the side of the fuselage 1, wherein the motor 3 is exposed outside the fuselage 1, and the motor 3 is high so that the folded blades are placed above a top face of the fuselage 1 as shown in FIG. 2. There are two rear arms which are connected to a rear of the fuselage 1 through the rotating mechanism 4, and the rotating mechanism 4 is placed at a rear of the upper groove 8 at the side of the fuselage 1. When being unfolded, the rear arms are respectively extended to the rear left and the rear right of the UAV, and the foldable blades 2 are also unfolded. When being folded, the foldable blades 2 are folded, and the rear arms rotate around the rotating mechanism 4 within a plane and towards the groove 8 of the fuselage 1 until the rear arm is contained in the upper groove 8 at the side of the fuselage 1, wherein the foldable blades 2 exposed outside the fuselage 1, and the motor 3 is short so that the folded blades are placed above the top face of the fuselage 1 as shown in FIG. 2. During folding the arms 5, the rear arms are folded into the upper grooves 8 at the sides of the fuselage 1 before folding the front arms into the lower grooves 8 at the sides of the fuselage 1.

The folding mechanisms 7 are respectively placed at four corners at the bottom of the fuselage 1 of the foldable UAV and are mounted on the bottom. The landing gears 6 are respectively connected to the folding mechanisms 7 and are able to rotate around the folding mechanisms 7 within a plane. The landing gears 6 are also formed by two front landing gears and two rear landing gears, wherein a distance between the folding mechanisms 7 connected to the front landing gears is shorter than a distance between the folding mechanisms connected to the rear landing gears, in such a manner that the front landing gears are interior to the rear landing gears after being folded without intersection, which further reduces a volume of the folded UAV. When being unfolded, the front landing gears rotate around the folding mechanisms 7 and extend to a front left and a front right of the fuselage 1; when being unfolded, the area landing gears rotate around the folding mechanisms 7 and extend to a rear left and a rear right of the fuselage 1

Alternatively, the landing gears 6 are also formed by two front landing gears and two rear landing gears, wherein a distance between the folding mechanisms 7 connected to the front landing gears is longer than a distance between the folding mechanisms connected to the rear landing gears, in such a manner that the front landing gears are exterior to the rear landing gears after being folded without intersection, which further reduces a volume of the folded UAV.

The rotating mechanism comprises a fuselage end, an arm end, and a shaft; wherein the fuselage end is connected to the arm end through the shaft. The fuselage end is a portion of the fuselage 1 which is near the arm 5, and the arm end is a portion of the arm 5 which is near the fuselage 1. End faces of both the fuselage end and the arm end are round end faces and match with each other during flight. In addition, the shaft is perpendicular to the two round end faces, and the shaft coincides with a central axis of the fuselage end as well as a central axis of the arm end. Both the fuselage end and the arm end have a shaft hole for inserting the shaft; a half of the shaft is placed in the shaft hole of the fuselage end, and another half of the shaft is placed in the shaft hole of the arm end. The shaft is fixedly connected to the fuselage end and is movably connected to the arm end, in such a manner that each of the arms rotates relative to the fuselage around the shaft. A convex is provided at a joint of the shaft and the arm 5, and a locking convex part is provided on the arm 5 for matching the convex, so as to lock the convex when the arms 5 rotate to an unfolded state.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable multi-rotor UAV (unmanned aerial vehicle), comprising:
    a fuselage; and
    a plurality of arms, wherein a first end of each of the arms is connected to a side face of the fuselage through a rotating mechanism; a motor and foldable blades connected to the motor are provided on a second end of each of the arms; each of the arms rotate relatively to the fuselage through the rotating mechanism;
    wherein the arms comprises a front arm and a rear arm; during a folded state, the rear arm upwardly rotates towards the fuselage for folding, in such a manner that the rear arm is contained at a lower portion of the side face of the fuselage, and the foldable blades on the rear arm are placed between the rear arm and the fuselage; then the front arm upwardly rotates towards the fuselage for folding, in such a manner that the front arm is contained at an upper portion of the side face of the fuselage, and the foldable blades on the front arm are placed between the front arm and the fuselage.

2. The foldable multi-rotor UAV, as recited in claim 1, wherein the rotating mechanism comprises a fuselage end, an arm end, and a shaft; wherein the fuselage end is connected to the arm end through the shaft; the fuselage end is connected to the fuselage, and the arm end is connected to one of the arms; the arms rotate relative to the fuselage when the shaft rotates.

3. The foldable multi-rotor UAV, as recited in claim 2, wherein both the fuselage end and the arm end have a shaft hole for inserting the shaft; a first portion of the shaft is placed in the shaft hole of the fuselage end, and a second portion of the shaft is placed in the shaft hole of the arm end.

4. The foldable multi-rotor UAV, as recited in claim 2, wherein the fuselage end of the rotating mechanism connected to the arms is placed above the arm end.

5. The foldable multi-rotor UAV, as recited in claim 2, wherein the rotating mechanism is S-shaped with certain curvatures.

6. The foldable multi-rotor UAV, as recited in claim 2, wherein the shaft is fixedly connected to the fuselage end and is movably connected to the arm end, in such a manner that each of the arms rotates relative to the fuselage around the shaft; or the shaft is fixedly connected to the arm end and is movably connected to the fuselage end, in such a manner that each of the arms and the shaft rotate relative to the fuselage; or the shaft is movably connected to both the arm end and the fuselage end, in such a manner the shaft, the arm end and the fuselage end rotate relative to each other.

7. The foldable multi-rotor UAV, as recited in claim 2, wherein the rotating mechanism comprises a limit locking device which is a buckle, a matching groove or an impeller.

8. The foldable multi-rotor UAV, as recited in claim 2, wherein end faces of both the fuselage end and the arm end are round end faces and match with each other.

9. The foldable multi-rotor UAV, as recited in claim 1, wherein all the arms have a certain curvature, and cross sections of each of the arms are different along a length direction; cross section areas vary from one end to the other end of each of the arms.

10. The foldable multi-rotor UAV, as recited in claim 1, wherein the rotating mechanism connected to the front arm is placed at a front top of the side face of the fuselage; the rotating mechanism connected to the rear arm is placed at a rear bottom of the side face of the fuselage.

11. A foldable multi-rotor UAV, comprising:
    a fuselage; and
    a plurality of arms, wherein a first end of each of the arms is connected to a side face of the fuselage through a rotating mechanism; a motor and foldable blades connected to the motor are provided on a second end of each of the arms; each of the arms rotate relatively to the fuselage through the rotating mechanism;
    wherein the arms comprises a front arm and a rear arm; during a folded state, the front arm upwardly rotates towards the fuselage for folding, in such a manner that the front arm is contained at an upper portion of the side face of the fuselage, and the foldable blades on the front arm are placed between the front arm and the fuselage; then the rear arm downwardly rotates towards the fuselage for folding, in such a manner that the rear arm is contained at a lower portion of the side face of the fuselage, and the foldable blades on the rear arm are placed exterior to the rear arm and away from the fuselage.

12. The foldable multi-rotor UAV, as recited in claim 11, wherein all the arms have a certain curvature, and cross sections of each of the arms are different along a length direction; cross section areas vary from one end to the other end of each of the arms.

13. The foldable multi-rotor UAV, as recited in claim 11, wherein the rotating mechanism comprises a fuselage end, an arm end, and a shaft; wherein the fuselage end is connected to the arm end through the shaft; the fuselage end is connected to the fuselage, and the arm end is connected to one of the arms; the arms rotate relative to the fuselage when the shaft rotates.

14. The foldable multi-rotor UAV, as recited in claim 13, wherein both the fuselage end and the arm end have a shaft hole for inserting the shaft; a first portion of the shaft is placed in the shaft hole of the fuselage end, and a second portion of the shaft is placed in the shaft hole of the arm end.

15. A foldable multi-rotor UAV, comprising:
   a fuselage; and
   a plurality of arms, wherein a first end of each of the arms is connected to a side face of the fuselage through a rotating mechanism; a motor and foldable blades connected to the motor are provided on a second end of each of the arms; each of the arms rotate relatively to the fuselage through the rotating mechanism;
   wherein the arms comprises a front arm and a rear arm; during a folded state, the front arm upwardly rotates towards the fuselage for folding, in such a manner that the front arm is contained at an upper portion of the side face of the fuselage, and the foldable blades on the front arm are placed exterior to the rear arm and away from the fuselage; then the rear arm downwardly rotates towards the fuselage for folding, in such a manner that the rear arm is contained at a lower portion of the side face of the fuselage, and the foldable blades on the rear arm are placed exterior to the rear arm and away from the fuselage.

16. The foldable multi-rotor UAV, as recited in claim 15, wherein the rotating mechanism comprises a fuselage end, an arm end, and a shaft; wherein the fuselage end is connected to the arm end through the shaft; the fuselage end is connected to the fuselage, and the arm end is connected to one of the arms; the arms rotate relative to the fuselage when the shaft rotates.

17. The foldable multi-rotor UAV, as recited in claim 16, wherein both the fuselage end and the arm end have a shaft hole for inserting the shaft; a first portion of the shaft is placed in the shaft hole of the fuselage end, and a second portion of the shaft is placed in the shaft hole of the arm end.

18. The foldable multi-rotor UAV, as recited in claim 16, wherein the arm end of the rotating mechanism connected to the arms is placed above the fuselage end.

19. The foldable multi-rotor UAV, as recited in claim 16, wherein the rotating mechanism is S-shaped with certain curvatures.

20. The foldable multi-rotor UAV, as recited in claim 16, wherein the shaft is fixedly connected to the fuselage end and is movably connected to the arm end, in such a manner that each of the arms rotates relative to the fuselage around the shaft; or the shaft is fixedly connected to the arm end and is movably connected to the fuselage end, in such a manner that each of the arms and the shaft rotate relative to the fuselage; or the shaft is movably connected to both the arm end and the fuselage end, in such a manner the shaft, the arm end and the fuselage end rotate relative to each other.

* * * * *